(12) United States Patent
Park

(10) Patent No.: US 11,445,542 B2
(45) Date of Patent: Sep. 13, 2022

(54) METHOD AND APPARATUS FOR TRANSMITTING OR RECEIVING DATA IN UNLICENSED BAND

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 78 days.

(21) Appl. No.: 17/051,611

(22) PCT Filed: Aug. 9, 2019

(86) PCT No.: PCT/KR2019/010061
§ 371 (c)(1),
(2) Date: Oct. 29, 2020

(87) PCT Pub. No.: WO2020/032675
PCT Pub. Date: Feb. 13, 2020

(65) Prior Publication Data
US 2021/0235487 A1   Jul. 29, 2021

(30) Foreign Application Priority Data

Aug. 10, 2018  (KR) ......................... 10-2018-0093928
Aug. 8, 2019   (KR) ......................... 10-2019-0096457

(51) Int. Cl.
*H04L 1/00*     (2006.01)
*H04W 74/08*    (2009.01)
(Continued)

(52) U.S. Cl.
CPC ......... *H04W 74/004* (2013.01); *H04L 1/0068* (2013.01); *H04W 72/042* (2013.01); *H04W 72/0453* (2013.01); *H04W 74/0816* (2013.01)

(58) Field of Classification Search
CPC ............. H04W 74/004; H04W 72/042; H04W 72/0453; H04W 74/0816; H04L 1/0068
(Continued)

(56) References Cited

U.S. PATENT DOCUMENTS

2018/0124687 A1   5/2018   Park et al.
2020/0077323 A1   3/2020   Park et al.

FOREIGN PATENT DOCUMENTS

KR   10-2018-0049800 A   5/2018

OTHER PUBLICATIONS

Samsung, "Channel access procedures for NR-U", R1-1806761, 3GPP TSG-RAN WG1 Meeting #93, Busan, Korea, May 21-25, 2018, pp. 1-5.
(Continued)

*Primary Examiner* — Angel T Brockman
(74) *Attorney, Agent, or Firm* — Invenstone Patent, LLC

(57) ABSTRACT

Provided are a method and apparatus for transmitting or receiving data in an unlicensed band. The method may include: receiving configuration information of one or more subbands relating to a cell system bandwidth included in an unlicensed band or a bandwidth part included in an unlicensed band; receiving downlink control information including uplink frequency domain resource allocation information for uplink data transmission in the bandwidth part or the system bandwidth; on the basis of the resource allocation information, performing an LBT operation on each of subbands including frequency resources allocated for the uplink data transmission; and on the basis of the result of the LBT operation, determining a subband for transmitting uplink data; and transmitting the uplink data in the determined subband.

6 Claims, 17 Drawing Sheets

(51) Int. Cl.
*H04W 74/00* (2009.01)
*H04W 72/04* (2009.01)

(58) Field of Classification Search
USPC .......................................................... 370/329
See application file for complete search history.

(56) References Cited

OTHER PUBLICATIONS

Ericsson, "Frame structure for NR-U", R1-1806250, 3GPP TSG-RAN WG1 Meeting #93, Busan, Korea, May 21-25, 2018, pp. 1-4.
Catr, "Considerations on LBT in NR-U", R1-1807205, 3GPP TSG RAN WG1 Meeting #93, Busan, Korea, May 21-25, 2018.
Huawei et al., "Summary of remaining issues on bandwidth part and wideband operation", R1-1801347, 3GPP TSG RAN WG1 Meeting #92, Athens, Greece, Feb. 26-Mar. 2, 2018.

METHOD AND APPARATUS FOR TRANSMITTING OR RECEIVING DATA IN UNLICENSED BAND

CROSS REFERENCE TO RELATED APPLICATIONS

This application is a National Stage Patent Application of PCT International Patent Application No. PCT/KR2019/010061 (filed on Aug. 9, 2019) under 35 U.S.C. § 371, which claims priority to Korean Patent Application Nos. 10-2018-0093928 (filed on Aug. 10, 2018), and 10-2019-0096457 (filed on Aug. 8, 2019), the teachings of which are incorporated herein in their entireties by reference.

TECHNICAL FIELD

The embodiments relates to methods and devices for transmitting and receiving data in an unlicensed band in a next-generation wireless access network (hereinafter, "new radio (NR)").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

Accordingly, there is a demand for a design for transmitting and receiving uplink data and downlink data using an unlicensed band in NR.

DETAILED DESCRIPTION OF THE INVENTION

Technical Problem

Embodiments of the disclosure may provide a method and device for transmitting and receiving uplink data and downlink data based on an Listen Before Talk (LBT) result for one or more subbands for a system bandwidth of a cell configured in an unlicensed band or a bandwidth part in an unlicensed band.

Technical Solution

In an aspect, according to embodiments, there may be provided a method for transmitting uplink data in an unlicensed band by a user equipment (UE). The method may include receiving configuration information for one or more subbands for a system bandwidth of a cell configured in the unlicensed band or a bandwidth part configured in the unlicensed band, receiving downlink control information including uplink frequency domain resource allocation information for transmitting uplink data in the bandwidth part or the system bandwidth, performing an LBT operation on each of subbands where a frequency resource allocated for uplink data transmission belongs, based on the resource allocation information and determining a subband for transmitting the uplink data based on a result of the LBT operation, and transmitting the uplink data in the determined subband.

In another aspect, according to embodiments, there may be provided a method for receiving uplink data in an unlicensed band by a base station. The method may include transmitting, to a UE, configuration information of one or more subbands for a system bandwidth of a cell configured in the unlicensed band or a bandwidth part configured in the unlicensed band, transmitting downlink control information including uplink scheduling information for one or more subbands, and receiving uplink data in a subband determined based on a result of performing an LBT operation by the UE on each of at least one subband, in the system bandwidth or the bandwidth part.

In another aspect, according to embodiments, there may be provided a UE for transmitting uplink data in an unlicensed band.

The UE may include a receiver for receiving configuration information for one or more subbands for a system bandwidth of a cell configured in the unlicensed band or a bandwidth part configured in the unlicensed band and receiving downlink control information including uplink frequency domain resource allocation information for transmitting uplink data in the bandwidth part or the system bandwidth, a controller performing an LBT operation on each of subbands where a frequency resource allocated for uplink data transmission belongs, based on the resource allocation information and determining a subband for transmitting the uplink data based on a result of the LBT operation, and a transmitter for transmitting the uplink data in the determined subband.

In another aspect, according to embodiments, there may be provided a base station for receiving uplink data in an unlicensed band. The base station may include a transmitter for transmitting, to a UE, configuration information of one or more subbands for a system bandwidth of a cell configured in the unlicensed band or a bandwidth part configured in the unlicensed band and transmitting downlink control information including uplink scheduling information for one or more subbands and a receiver for receiving uplink data in a subband determined based on a result of performing an LBT operation by the UE on each of at least one subband, in the system bandwidth or the bandwidth part.

In another aspect, according to embodiments, there may be provided a method for receiving downlink data in an unlicensed band by a UE. The method may include receiving, from a base station, configuration information for one or more subbands for a system bandwidth of a cell configured in the unlicensed band or a bandwidth part configured in the unlicensed band, receiving downlink control information including subband indication information determined form downlink data transmission based on a result of performing a per-subband LBT on the one or more subbands by the base station, and receiving the downlink data in the determined subband.

In another aspect, according to embodiments, there may be provided a method for transmitting downlink data in an unlicensed band by a base station. The method may include transmitting, to a UE, configuration information for one or more subbands for a system bandwidth of a cell configured in the unlicensed band or a bandwidth part configured in the unlicensed band, performing an LBT operation on each of one or more subbands and determining a subband for transmitting downlink data based on a result of the LBT operation, transmitting downlink control information including indication information for the determined subband, and transmitting downlink data in the determined subband.

In another aspect, according to embodiments, there may be provided a UE for receiving downlink data in an unlicensed band. The UE may include a receiver for receiving, from a base station, configuration information for one or more subbands for a system bandwidth of a cell configured in the unlicensed band or a bandwidth part configured in the unlicensed band, and receiving downlink control information including subband indication information determined form downlink data transmission based on a result of performing a per-subband LBT on the one or more subbands by the base station, and receiving the downlink data in the determined subband, and a controller for controlling the operation of the receiver.

In another aspect, according to embodiments, there may be provided a base station for transmitting downlink data in an unlicensed band. The base station may include a transmitter for transmitting, to a UE, configuration information for one or more subbands for a system bandwidth of a cell configured in the unlicensed band or a bandwidth part configured in the unlicensed band, and a controller for performing an LBT operation on each of one or more subbands and determining a subband for transmitting downlink data based on a result of the LBT operation, wherein the transmitter transmits downlink control information including indication information for the determined subband and transmits downlink data in the determined subband.

Advantageous Effects

According to embodiments of the disclosure, there may be provided a method and device capable of transmitting and receiving uplink data and downlink data based on an LBT result for a plurality of subbands for a system bandwidth of a cell configured in an unlicensed band or a bandwidth part in an unlicensed band.

MODE FOR CARRYING OUT THE INVENTION

Figure 1:
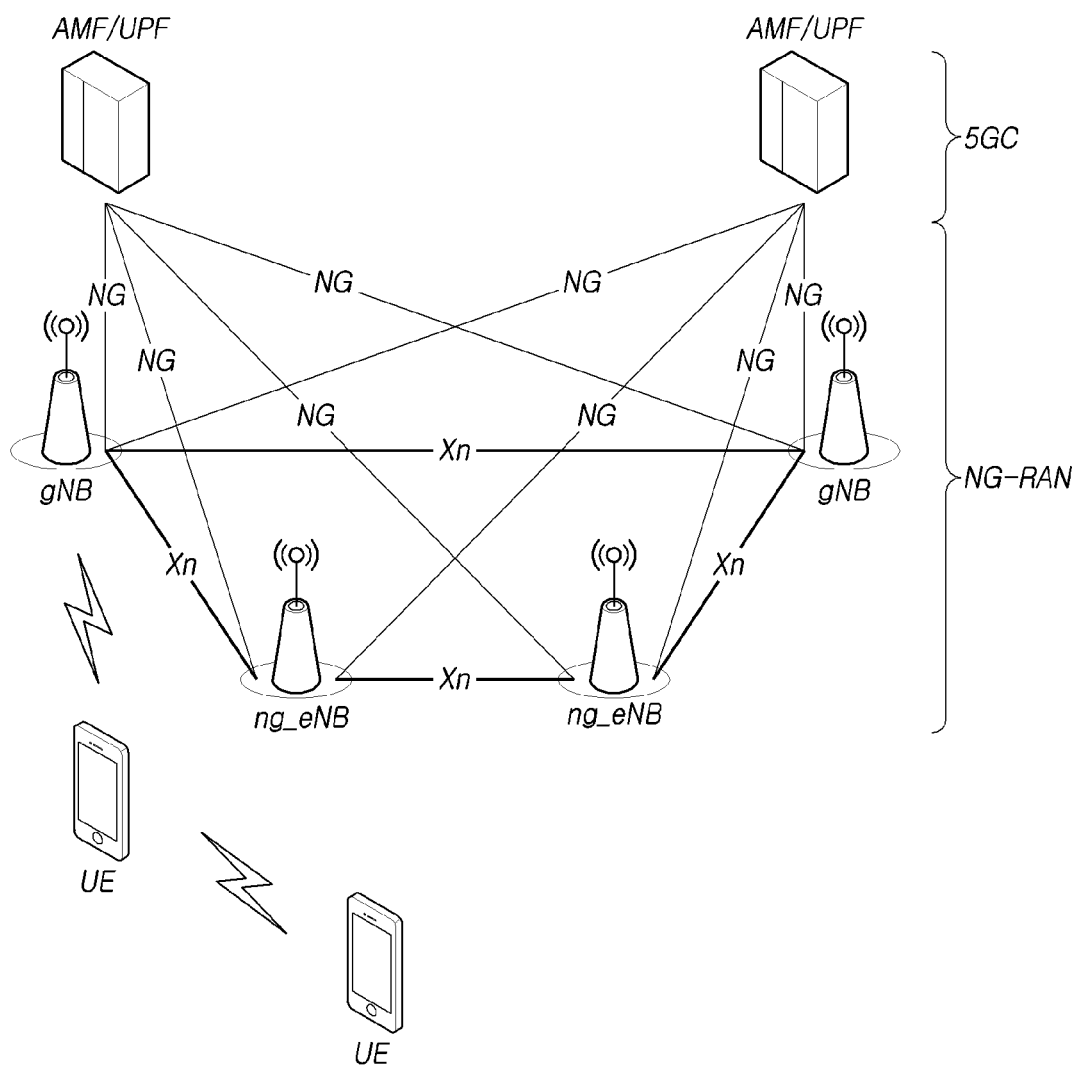
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, Wi-Fi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "µ" is used as an exponential value of 2 so as to be changed exponentially on the basis of 15 kHz.

TABLE 1

| µ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
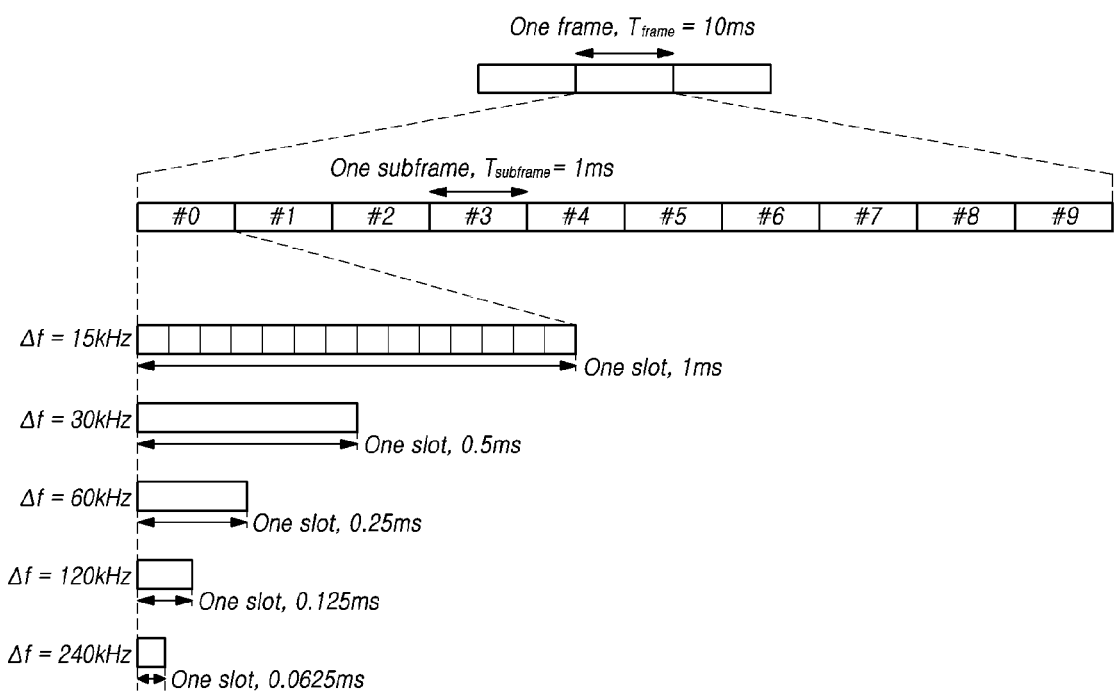
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-colocation (QC/QCL) relationship. The large-scale properties include at least one of delay spread, Doppler spread, a frequency shift, an average received power, and a received timing.

Figure 3:
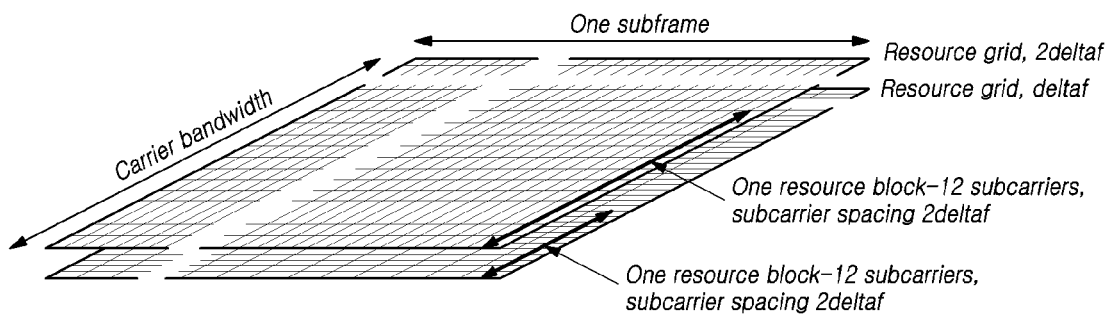
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
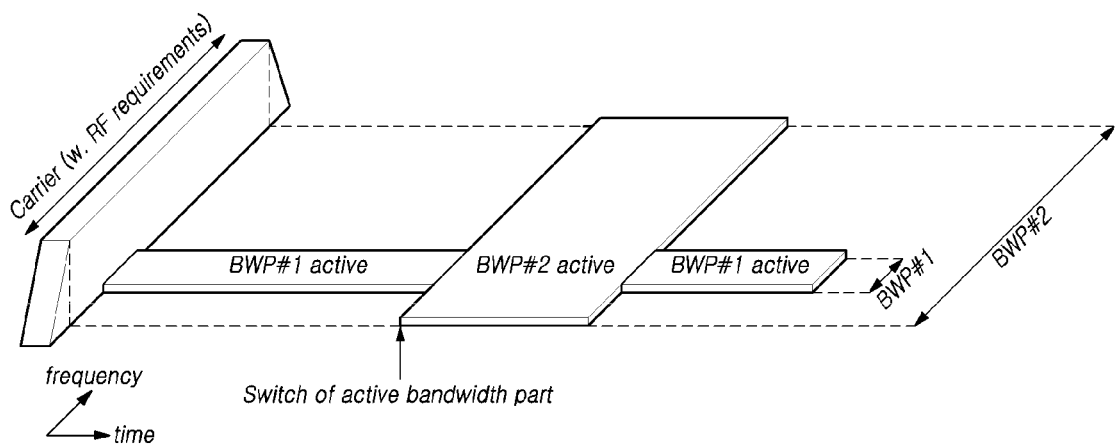
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
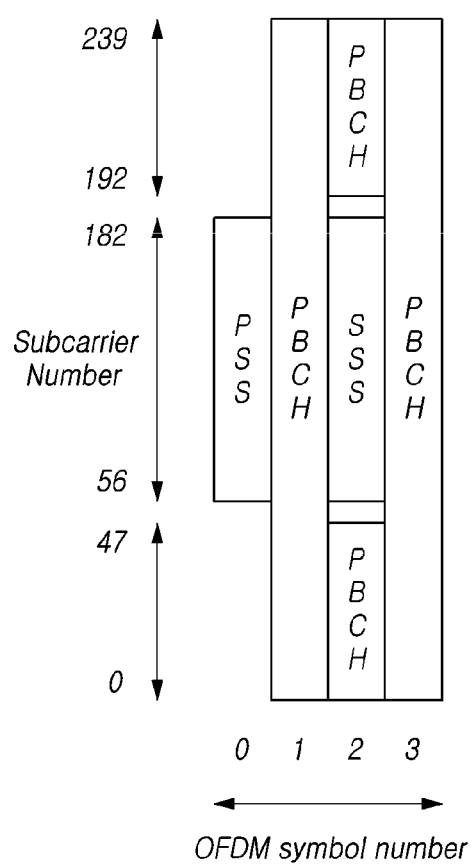
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
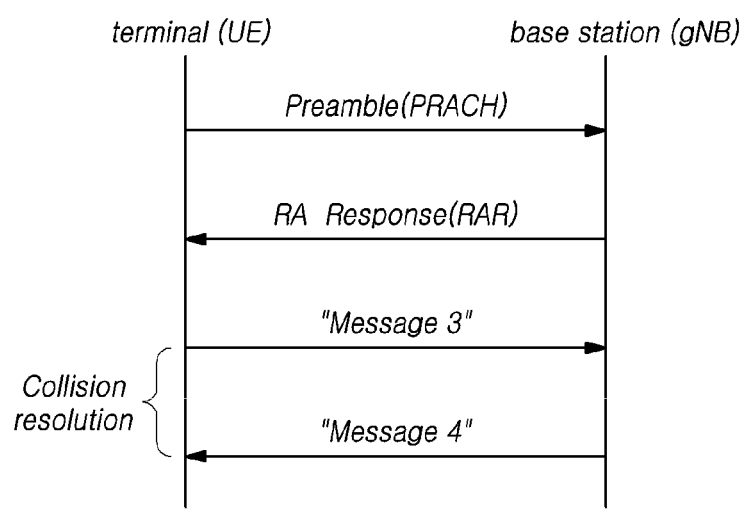
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
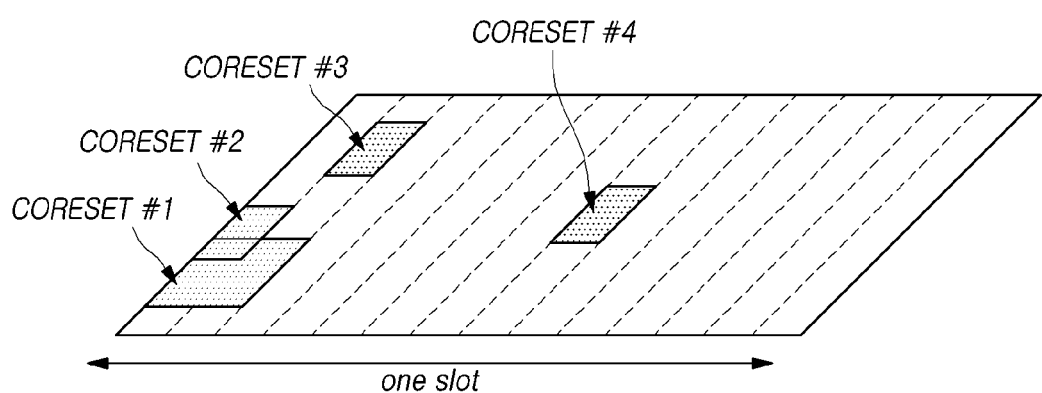
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

Further, a bandwidth configured as a predetermined frequency section in a carrier bandwidth is denoted a bandwidth part or BWP below, but the disclosure is not limited to such terms. Further, although a bandwidth configured as a predetermined frequency section in a bandwidth part is denoted a subband, the disclosure is not limited to the terms.

Further, the term "subband configuration information" used below is an arbitrary term meaning pieces of information necessary for configuring a subband, but is not limited thereto. The subband configuration information may be interchangeably used with other various terms indicating the same meaning. Likewise, LBT configuration information means information needed when the UE performs an LBT and may be interchangeably used with other various terms indicating the same meaning.

For ease of description, LBT (Listen Before Talk) is described as an example of technology for coexistence of wireless communication technologies in an unlicensed band. However, the disclosure is applicable to other various coexistence techniques. Of course, the disclosure may apply not only to 5G or NR technology, which is a next-generation wireless communication technology, but also to 4G, Wi-Fi, or other various wireless communication technologies.

NR (New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra-reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
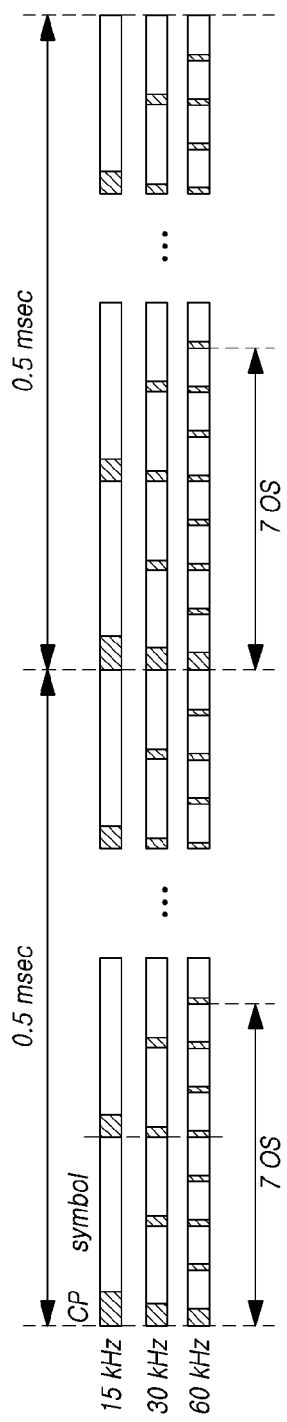
FIG. 8 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

PDCCH

The NR and LTE/LTE-A system transmits and receives, via the PDCCH, L1 control information, such as downlink (DL) allocation, downlink control information (DCI), and uplink (UL) grant DCI. As a resource unit for transmission of the PDCCH, a control channel element (CCE) is defined. In NR, the control resource set (CORESET) is the frequency/time resource for PDCCH transmission and may be configured in each UE. Further, each CORESET may be configured of one or more search spaces constituted of one or more PDCCH candidates for the UE to monitor the PDCCH.

Wider Bandwidth Operations

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a typical LTE UE supports a transmission/reception capability of a bandwidth of 20 MHz for a single LTE CC.

Figure 9:
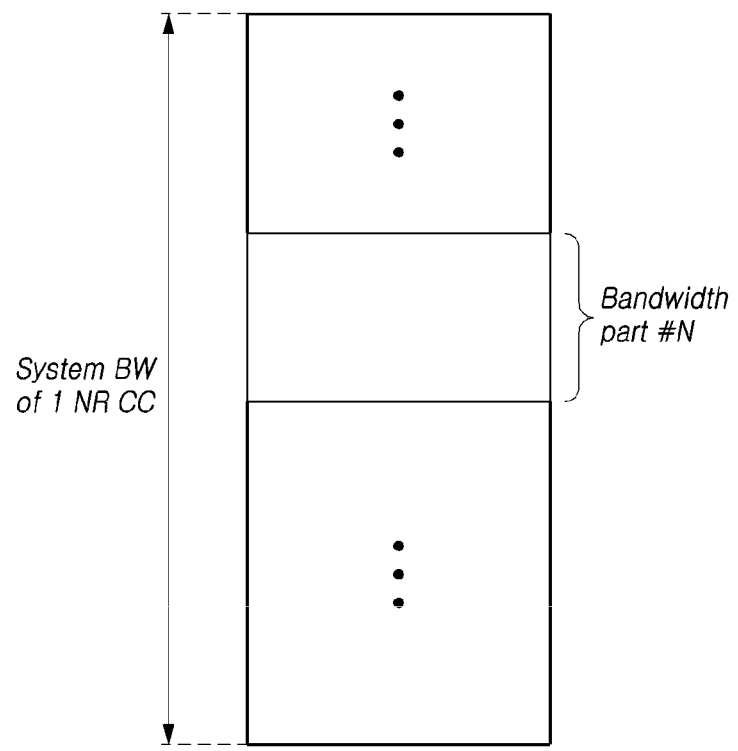
FIG. 9 is a view schematically illustrating a bandwidth part.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

Uplink Control Information (UCI) Transmission Procedure

According to the PUCCH resource allocation method for HARQ ACK/NACK feedback of the UE, as defined in NR, upon PDSCH resource allocation, the base station indicates uplink control channel (PUCCH) resource allocation information for HARQ ACK feedback for the PDSCH via the ACK resource indicator (ARI) information region of the downlink (DL) allocation DCI format. Specifically, the base station transmits configuration information of one or more PUCCH resource sets constituted of one or more PUCCH resources for each uplink bandwidth part (UL BWP) configured for any UE, to each UE via RRC signaling. Thus, the ARI has been defined to indicate the PUCCH resource index for HARQ ACK feedback for any PDSCH, and the PUCCH resource set is determined by the payload size of the UCI to be transmitted via the PUCCH of the corresponding slot.

Further, PUCCH resources for UCI transmission, such as scheduling request (SR) or channel state information (CSI), other than HARQ ACK/NACK, may be allocated via higher layer signaling or indicated via downlink control information (DCI).

However, where the PUCCH resource for UCI transmission and the PUSCH resource for data transmission overlap each other in any slot in the time domain, the corresponding UCI may be multiplexed with the PUSCH and be then transmitted.

Specifically, according to a method of multiplexing the UCI with the PUSCH and reporting it, it has been defined that if the PUCCH resource for UCI transmission and the PUSCH transmission resource for data transmission overlap in the time domain, and a time condition considering the UE's uplink/downlink transmission/reception processing time is met, the UCI is multiplexed via the PUSCH transmission resource and transmitted. Further, in this case, it has been defined that the base station sets an offset value (offset) for determining the amount of resources to be used for UCI transmission among specific resources for UCI multiplexing, i.e., allocated PUSCH transmission resources and transmits it to the UE via DCI or higher layer signaling.

PUSCH Transmission Method of LTE LAA (Licensed Assisted Access)

According to the PUSCH transmission method defined in LTE LAA, a multi-subframe scheduling method and a PUSCH transmission method via UL grant DCI and separate PUSCH triggering DCI transmission have been defined to minimize PUSCH performance degradation due to an additional LBT performing for PUSCH transmission of the UE.

Among them, PUSCH transmission according to PUSCH triggering is a method of PUSCH transmission indication for a UE in the base station and is a new PUSCH scheduling method defined for LAA, which allocates a PUSCH transmission resource for the corresponding UE via UE-specific UL grant DCI transmission and separately transmits, later, the PUSCH triggering DCI for triggering the UE's PUSCH transmission.

Meanwhile, two methods may be used for unlicensed band downlink channel access. A type-1 uplink channel access method defines channel access priority depending on the QoS of the data included in the PUSCH transmitted by the UE, performs an LBT using the parameter value given according to the priority, and performs a channel access/occupancy procedure. A type-2 uplink channel access method determines whether the channel is available only by a one-time sensing during the Tshort_ul interval upon transmission of the uplink data channel, occupies the channel, and transmits the PUSCH. Here, as used to perform the LBT, Tshort_ul=25 us. If the channel is sensed as "available" during the Tshort_ul interval, the channel is regarded as available, and the UE occupies the channel and transmits the PUSCH.

For PUSCH transmission, the base station indicates, to the UE, the uplink channel access type (UL channel access type-1 or type-2) and the channel access priority class using uplink (UL) grant information. The UE performs a channel access procedure according to the uplink channel access type indicated for uplink data transmission via the PUSCH.

Unlike the method for the UE to perform PUSCH transmission using a licensed band, an unlicensed band needs to increase the opportunity of PUSCH transmission. To that end, a method of transmitting the PUSCH using a single subframe and a method of transmitting the PUSCH using a plurality of subframes both may be put to use. As transmission modes for PUSCH transmission as in a licensed band, TM1 and TM2 both are supported. As the DCI for scheduling transmission of a single subframe/multiple subframes in TM1, DCI format 0A/DCI format 0B are used. As the DCI for scheduling transmission of a single subframe/multiple subframes in TM2, DCI format 4A/DCI format 4B are used.

The base station may flexibly indicate, to the UE, the timing of PUSCH transmission, from 4 ms to 20 ms, with respect to the minimum delay time (e.g., 4 ms) upon PUSCH scheduling in an unlicensed band. To that end, the base station may add the field of timing offset to each piece of uplink grant information to indicate the flexible transmission timing.

Further, the base station may schedule the PUSCH for the UE, via two triggering types (type-A and type-B). Triggering type A is a method in which the uplink grant information includes all information related to PUSCH transmission and includes absolute PUSCH transmission timing information to indicate the PUSCH transmission to the UE. This may be similar to the typical method in a licensed band. In triggering type B, all information related to PUSCH transmission is included in the uplink grant information, and relative PUSCH transmission timing information is included and transmitted. Here, the timing information actually transmitted is determined by the indicator of PUSCH trigger B transmitted when triggering type B receives the C-PDCCH and 'UL duration and offset' information.

NR-U (NR-Unlicensed Spectrum)

Unlike licensed bands, unlicensed bands are wireless channels that are allowed to be used by any provider or person in order to provide wireless communication services within the regulations of respective countries, instead of being exclusively used by a specific provider. Accordingly, it is required to solve i) a problem caused by co-existence with various short-range wireless communication protocols, such as Wi-Fi, Bluetooth, NFC, or the like, which is provided through unlicensed bands and ii) a problem caused by co-existence of NR providers and LTE providers when providing NR services through the corresponding unlicensed bands.

Therefore, in order to avoid interference or collision between the respective wireless communication services when providing NR services through the unlicensed band, it is necessary to support an LBT (listen before talk)-based wireless channel access scheme. In the LBT based wireless channel access scheme, a power level of a wireless channel or a carrier is sensed before transmitting a radio signal in order to determine whether or not the wireless channel or the carrier is available. In this case, if a specific wireless channel or carrier of the unlicensed band is in use by another wireless communication protocol or another provider, the NR services through the corresponding band will be limited, so that the QoS requested by the user may not be guaranteed in the wireless communication services through the unlicensed band, compared to the wireless communication services through the licensed band.

Further, where some wideband NR-U cell is configured via an unlicensed band, coexistence with other RAT needs to be considered to increase the access probability for the NR-U cell. In this case, the DL or UL BWP configured for any UE in the NR-U cell or the system bandwidth of a NR-U cell is divided into subbands, the LBT is performed in the corresponding subband unit, and a design for a wireless protocol for radio signal transmission in the subband unit is needed.

Hereinafter, a method for transmitting and receiving uplink data in an unlicensed band will be described in detail with reference to the accompanying drawings.

Figure 10:
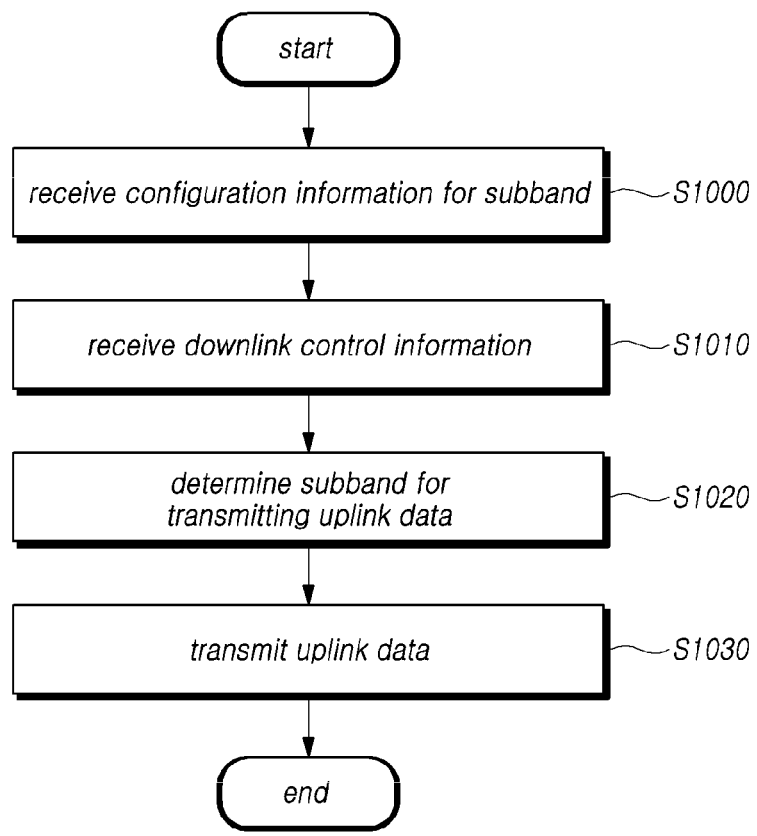
FIG. 10 is a flowchart illustrating a procedure for transmitting uplink data in an unlicensed band by a UE according to an embodiment.

FIG. 10 is a flowchart illustrating a procedure for transmitting uplink data in an unlicensed band by a UE according to an embodiment.

Referring to FIG. 10, the UE may receive configuration information for one or more subbands for the system bandwidth of the cell configured in an unlicensed band or a bandwidth part configured in the unlicensed band (S1000).

In NR, a bandwidth part (BWP) may be configured for each UE for transmission/reception of uplink or downlink radio physical channels and physical signals for the UE. The UE may activate one bandwidth part among the configured bandwidth parts and transmit/receive data. Since a wideband of 100 MHz or more is possible as the system bandwidth constituting the NR cell, the bandwidth of one BWP for a UE may be configured as a wideband of 100 MHz or more.

Meanwhile, for any node to transmit a radio signal in an unlicensed band, an LBT is first performed to identify whether the corresponding radio channel is occupied by another node. Thus, for PDSCH transmission for the UE in the NR-U cell in the unlicensed band, the base station performs an LBT on the frequency band in which the corresponding NR-U cell is configured. If the corresponding frequency band is empty, the base station may perform PDCCH and hence PDSCH transmission. Likewise, for the UE to perform uplink signal transmission, the UE needs to first perform an LBT on the uplink radio channel.

Where bandwidth parts are configured in an unlicensed band, the bandwidth of the DL BWP or UL BWP for a UE in the NR-U cell may be configured to be larger than 20 MHz. In this case, if an LBT is performed in BWP units and data transmission/reception is performed, the competitivity in light of channel access probability may be significantly degraded as compared with other radio access technology (RAT), e.g., Wi-Fi, which performs an LBT in 20 MHz units.

Accordingly, one or more subbands with a bandwidth may be configured for the DL BWP or UL BWP configured for the UE. The base station or UE may perform an LBT in the corresponding subband unit. In other words, as used herein, 'subband' may mean a unit on the frequency axis where clear channel assessment (CCA) for uplink/downlink transmission is performed by the base station or UE regardless of the DL BWP or UL BWP configured for a UE or the system bandwidth of a NR cell configured via an unlicensed band. That is, as used herein, 'subband' may mean the LBT bandwidth corresponding to the unit in which the LBT is performed on the frequency axis. Thus, resource allocation for the DL BWP and transmission/reception of PDCCH or PDSCH may be performed in the corresponding subband unit. Likewise, resource allocation for the UL BWP and transmission/reception of PUCCH or PUSCH may be performed in the corresponding subband unit. Or, resource allocation may be performed in DL BWP or UL BWP units as typical, but whether actual PDSCH/PUSCH transmission/reception is performed via the allocated resource may be determined by the result of performing the LBT in the subband unit.

As an example, to reduce the frequency range of the LBT which needs to be performed by the base station or the UE, the base station may divide each uplink/downlink bandwidth part configured in the UE into a plurality of subbands. To that end, subband configuration information may be set per bandwidth part. That is, where four bandwidth parts are configured in the UE, the number of subbands, position, and size may be identical or different per bandwidth part. Or, as another example, the subband may be configured based on the system bandwidth constituting the NR cell of the corresponding unlicensed band independently from the bandwidth part configured for a UE.

For example, the subband configuration information may include at least one of the number of subbands in each bandwidth part or the system bandwidth, the bandwidth of the subband, the size of the subband, the number of PRBs of the subband, and bandwidth part identification information mapped to each subband.

For example, the subband configuration information may be included and received in higher layer signaling. The higher layer signaling including the subband configuration information may include LBT configuration information for each subband for performing an LBT operation in each subband. For example, the higher layer signaling may include LBT configuration information including information (e.g., a threshold) needed for the UE to perform the LBT in each subband. The LBT configuration information may include different parameters for each subband or the same parameters may be configured regardless of the subbands. As another example, the subband, which is the unit of LBT on the frequency axis, may be configured implicitly in the unit of the bandwidth part configured for a UE or the system bandwidth of the NR-U cell, i.e., according to a predetermined rule without signaling including separate subband configuration information.

Referring back to FIG. 10, the UE may receive downlink control information including uplink scheduling information for uplink data transmission in the bandwidth part configured of one or more subbands (S1010).

For example, the UE receives uplink scheduling information from the base station to transmit uplink data in the bandwidth part including one or more subbands. Here, the bandwidth part may be configured of one or more subbands as described above. Accordingly, the uplink scheduling information may further include subband allocation information. For example, the uplink scheduling information may include subband allocation information for frequency resource allocation for uplink data transmission and subband-based frequency domain resource allocation information. In this case, the subband allocation information may be indication information based on the bitmap per subband or may be configured as the subband ID or subband index indication information.

As another example, the UE receives uplink scheduling information from the base station to transmit uplink data in the bandwidth part including one or more subbands. Here, the bandwidth part may be configured of one or more subbands as described above. In contrast, the uplink scheduling information may include only bandwidth part-based frequency domain resource allocation information for frequency resource allocation for user device transmission, as conventional. The uplink scheduling information may not include the above-described separate subband allocation information.

Referring back to FIG. 10, where the separate subband allocation information is included based on the uplink scheduling information, the UE may perform an LBT operation for each subband indicated by the subband allocation information, determine (S1020) the subband for transmitting uplink data based on the result of the LBT operation, and transmit (S1030) uplink data in the determined subband.

Or, unless the separate subband allocation information is included based on the uplink scheduling information, the UE may perform an LBT operation for each of all the subbands where the PRBs (or VRBs) allocated in the corresponding bandwidth part by the frequency domain resource allocation information for uplink data transmission belong, determine (S1020) the subband for transmitting uplink data based on the result of the LBT operation, and transmit (S1030) uplink data in the determined subband.

As an example, the UE performs an LBT operation for the radio resource allocated to the UE based on uplink scheduling information. The UE may perform an LBT operation on each of at least one or more subbands explicitly or implicitly indicated by the uplink scheduling information among the one or more subbands constituting the bandwidth part. For example, the LBT operation may include sensing the energy level of the corresponding radio resource and comparing the sensed energy level with a predetermined reference energy level.

As a result of the LBT in the subband unit, the UE may perform uplink data transmission according to the uplink scheduling information.

As an example, upon identifying that the LBT operation is successful for all of the subbands in which the LBT operation has been performed, the UE may determine that all of the subbands are subbands for uplink data transmission. In this case, the UE may be configured to transmit uplink data only when the LBT operation is identified to succeed on all of the subbands in which the LBT operation has been performed. In other words, it may be defined that where the uplink scheduling information includes subband indication information, only when the LBT operation for all indicated subbands are identified to succeed, uplink data is transmitted according to the corresponding uplink scheduling information. Or, it may be defined that, in the case where the uplink scheduling information includes no separate subband indication information, only when the LBT operation for all the subbands where the PRBs (or VRBs) allocated for uplink data transmission by the frequency domain resource allocation information for uplink data transmission belong is identified to succeed, uplink data is transmitted. For example, it is hypothesized that four subbands are configured in the bandwidth part activated for the UE. Where three of the four subbands are explicitly indicated by the subband indication information for uplink data transmission by the uplink scheduling information or implicitly indicated by the frequency resource allocation information, the UE may perform the LBT operation for the three subbands. Only when the LBT operation for the three subbands is identified to succeed, the UE may transmit uplink data using the three subbands.

Or, as an example, the UE may perform uplink data transmission for some subbands where the LBT operation succeeds. In other words, where the LBT succeeds only for some subbands among all the subbands where the PRBs (or VRBs) allocated for uplink data transmission according to the frequency domain resource allocation information indicated by the uplink scheduling information belong, but the LBT fails for the remaining subbands, uplink data channel (PUSCH) may be transmitted only via the allocated PRBs (or VRBs) of the LBT successful subbands. In this case, the mapping to the radio resource belonging to the LBT-failed subbands is punctured or rate-matched in resource mapping for the data transport block generated according to the uplink scheduling information.

Or, where uplink data transmission is possible in two or more subbands as a result of performing the LBT operation, the UE may transmit uplink data using one or more subband radio resources by the above-described subband selection rule. For example, the UE may select one or more subbands according to the subband selection rule, such as selecting the subband with the lowest or highest subband index among the one or more subbands selected as a result of the LBT operation, selecting the subband in which a reference signal is received, selecting the subband indicated by the base station, or selecting the subband set as default.

According to the embodiments described above, there may be provided a method and device capable of transmitting and receiving uplink data based on the LBT result for one or more subbands for the bandwidth part in the unlicensed band. By so doing, the UE may prevent a reduction in data transmission probability that may arise as the LBT is performed in a wide frequency area and meet the data transmission QoS using the unlicensed band. Hereinafter, operations of the base station, related to the above-described UE operations, will be described with reference to the accompanying drawings.

Figure 11:
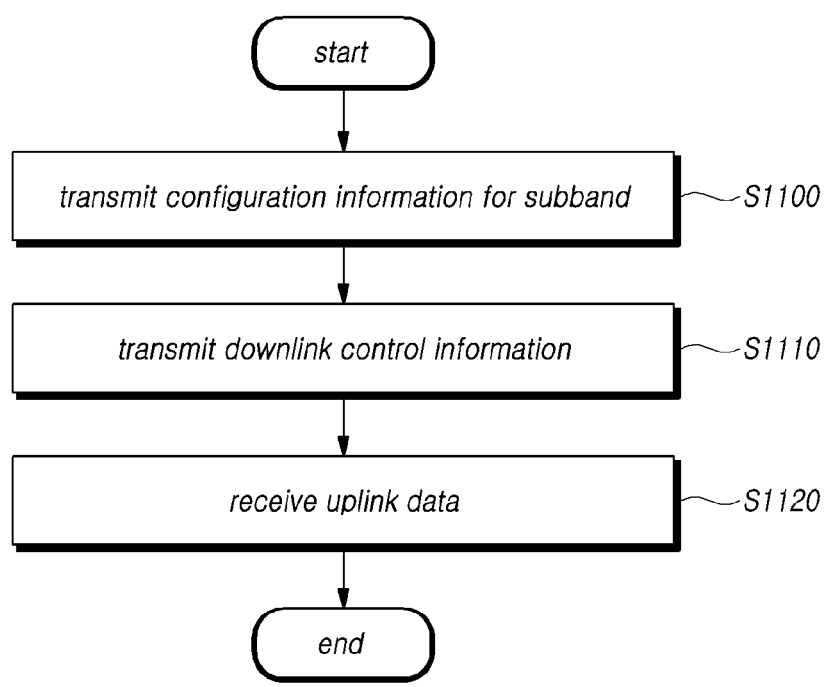
FIG. 11 is a flowchart illustrating a procedure for receiving uplink data in an unlicensed band by a base station according to an embodiment.

FIG. 11 is a flowchart illustrating a procedure for receiving uplink data in an unlicensed band by a base station according to an embodiment.

Referring to FIG. 11, the base station may transmit configuration information for one or more subbands for the system bandwidth of the cell or the bandwidth part configured in an unlicensed band to the UE (S1100).

Accordingly, one or more subbands with a bandwidth may be configured for the DL BWP or UL BWP configured for the bandwidth. The base station or UE may perform an LBT in the corresponding subband unit.

For example, to reduce the frequency range of the LBT which needs to be performed by the UE, the base station may divide the bandwidth part configured in the UE into a plurality of subbands. To that end, subband configuration information may be set per bandwidth part.

For example, the subband configuration information may include at least one of the number of subbands in each bandwidth part, the bandwidth of the subband, the size of the subband, the number of PRBs of the subband, and bandwidth part identification information mapped to each subband.

For example, the subband configuration information may be included and transmitted in higher layer signaling. The higher layer signaling including the subband configuration information may include LBT configuration information for each subband for performing an LBT operation in each subband. For example, the higher layer signaling may include LBT configuration information including information (e.g., a threshold) needed for the UE to perform the LBT in each subband. The LBT configuration information may include different parameters for each subband or the same parameters may be configured regardless of the subbands. As another example, the subband, which is the unit of LBT on the frequency axis, may be configured implicitly in the unit of the bandwidth part configured for a UE or the system bandwidth of the unlicensed band NR-U cell, i.e., according to a predetermined rule without signaling including separate subband configuration information.

Referring back to FIG. 11, the base station may transmit downlink control information including uplink scheduling information for uplink data transmission in the bandwidth part configured of one or more subbands (S1110).

For example, the base station transmits uplink scheduling information to the UE to receive uplink data in the bandwidth part including one or more subbands. Here, the bandwidth part may be configured of one or more subbands as described above. Accordingly, the uplink scheduling information may further include subband allocation information. For example, the uplink scheduling information may include subband allocation information for frequency resource allocation for uplink data transmission and subband-based frequency domain resource allocation information. In this case, the subband allocation information may be indication information based on the bitmap per subband or may be configured as the subband ID or subband index indication information.

As another example, the base station transmits uplink scheduling information to the UE to transmit uplink data in the bandwidth part including one or more subbands. Here, the bandwidth part may be configured of one or more subbands as described above. In contrast, the uplink scheduling information may include only bandwidth part-based frequency domain resource allocation information for frequency resource allocation for user device transmission, as typical. The uplink scheduling information may not include the above-described separate subband allocation information.

Referring back to FIG. 11, where the separate subband allocation information is included based on the uplink scheduling information, the base station may receive uplink data in the subband determined based on the result of performing the LBT operation by the UE for each subband indicated by the subband allocation information (S1120).

Or, unless the separate subband allocation information is included based on the uplink scheduling information, the base station may receive uplink data in the subband determined as a result of performing the LBT operation by the UE for each of all the subbands where the PRBs (or VRBs) allocated in the corresponding bandwidth part by the frequency domain resource allocation information for uplink data transmission belong (S1120).

By the above-described UE operations, the base station may receive uplink data from the UE via the radio resource of the selected subband.

As an example, the UE performs an LBT operation for the radio resource allocated to the UE by uplink scheduling information. The UE may perform an LBT operation on each of at least one or more subbands explicitly or implicitly indicated by the uplink scheduling information among the one or more subbands constituting the bandwidth part. For example, the LBT operation may include sensing the energy level of the corresponding radio resource and comparing the sensed energy level with a predetermined reference energy level.

As a result of the LBT in the subband unit, the UE performs uplink data transmission according to the uplink scheduling information.

As an example, upon identifying that the LBT operation is successful for all of the subbands in which the LBT operation has been performed, the UE may determine that all of the subbands are subbands for uplink data transmission. In this case, the UE may be configured to transmit uplink data only when the LBT operation is identified to succeed on all of the subbands in which the LBT operation has been performed. In other words, it may be defined that where the uplink scheduling information includes subband indication information, only when the LBT operation for all indicated subbands are identified to succeed, uplink data is transmitted according to the corresponding uplink scheduling information. Or, it may be defined that, in the case where the uplink scheduling information includes no separate subband indication information, only when the LBT operation for all the subbands where the PRBs (or VRBs) allocated for uplink data transmission by the frequency domain resource allocation information for uplink data transmission belong is identified to succeed, uplink data is transmitted. For example, it is hypothesized that four subbands are configured in the bandwidth part activated for the UE. Where three of the four subbands are explicitly indicated by the subband indication information for uplink data transmission by the uplink scheduling information or implicitly indicated by the frequency resource allocation information, the UE may perform the LBT operation for the three subbands. Only when the LBT operation for the three subbands is identified to succeed, the UE may transmit uplink data using the three subbands.

Or, as an example, the UE may perform uplink data transmission some subbands where the LBT operation succeeds. In other words, where the LBT succeeds only for some subbands among all the subbands where the PRBs (or VRBs) allocated for uplink data transmission according to the frequency domain resource allocation information indicated by the uplink scheduling information belong, but the LBT fails for the remaining subbands, uplink data channel (PUSCH) may be transmitted only via the allocated PRBs (or VRBs) of the LBT successful subbands. In this case, in resource mapping for the data transport block generated according to the uplink scheduling information, the mapping to the radio resource belonging to the LBT-failed subbands is punctured or rate-matched.

According to the embodiments described above, there may be provided a method and device capable of transmitting and receiving uplink data based on the LBT result for one or more subbands for the bandwidth part in the unlicensed band. By so doing, the UE may prevent a reduction in data transmission probability that may arise as the LBT is performed in a wide frequency area and meet the data transmission QoS using the unlicensed band.

The above-described operations of the UE and base station are merely some embodiments, and more various embodiments may be performed in the corresponding operation and step. Thus, various embodiments in each procedure for performing the technical spirit are described below. In each embodiment, the pieces of information may be included in, e.g., the above-described subband configuration information, LBT configuration information, downlink control information, or subband selection rule or may be transferred to the UE via separate signaling.

Each embodiment of allocating a plurality of transmission opportunities on the frequency axis upon transmission a uplink radio channel or radio signal to increase the transmission probability for uplink in an unlicensed band in NR is described below in detail.

As described above, for a node to transmit a radio signal in an unlicensed band, an LBT (Listen Before Talk) process is first performed to identify whether the corresponding radio channel is occupied by another node. Accordingly, for PDSCH transmission for a UE in the NR-U cell in the unlicensed band configured by a NR base station, the base station needs to perform an LBT for the frequency band where the corresponding NR-U cell is configured. Where the radio channel in the corresponding unlicensed band is empty as a result of performing the LBT, the base station may transmit the PDCCH and resultantly PDSCH to the UE.

Likewise, for the UE to perform uplink signal transmission, the UE needs to first perform an LBT on the uplink radio channel. Thus, the UE needs to first perform an LBT upon transmitting the PUSCH for uplink data transmission. The UE may not transmit the scheduling control information received from the base station, i.e., unable to transmit the corresponding PUSCH at the time indicated by the UL grant DCI format, depending on whether the corresponding LBT succeeds. In other words, upon an LBT failure, PUSCH transmission by the corresponding UL grant may fail.

As an example, in NR, for the HARQ ACK/NACK feedback timing for the UE's PDSCH reception, the base station may set it via RRC signaling or may indicate, to the corresponding UE, via downlink allocation DCI (DL allocation DCI). However, in the case of the above-described NR-U cell for the unlicensed band, it may be impossible to transmit the PUCCH including the HARQ ACK/NACK feedback information at the time indicated by the base station according to the result of the LBT by the UE. In other words, where an LBT failure, which is the case where the corresponding radio channel is occupied by another node, occurs as a result of the LBT, the UE fails to transmit the HARQ ACK/NACK feedback information according to the PDSCH reception at the time indicated by the base station. Such a defect may seriously degrade the HARQ performance in the NR-U cell.

Figure 12:
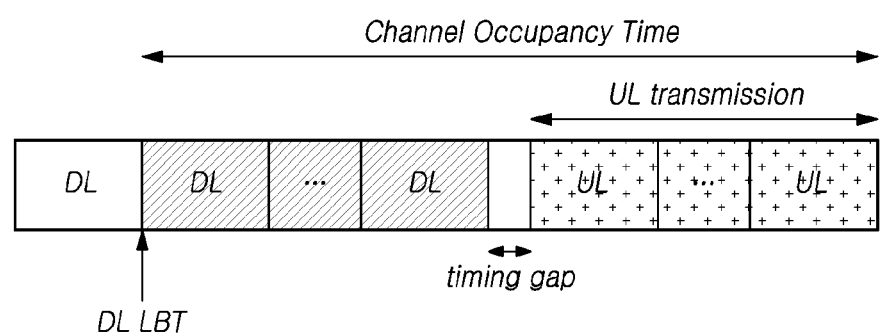
FIG. 12 is a view illustrating an example of performing an LBT for wireless communication in an unlicensed band according to an embodiment.

FIG. 12 is a view illustrating an example of performing an LBT for wireless communication in an unlicensed band according to an embodiment.

As an example, it may be defined that, upon PUCCH transmission resource allocation for a UE or upon PUSCH transmission resource allocation, it is indicated by the base station whether to perform an LBT in the corresponding UE. The UE may transmit uplink control information (UCI), e.g., HARQ ACK/NACK feedback information or CQI/CSI reporting information, to the base station via the PUCCH. In relation thereto, in NR, the time resource and frequency resource, which is the PUCCH resource for transmission of the HARQ feedback, may be indicated by the base station via downlink allocation DCI (DL allocation DCI). Or, the PUCCH resource for transmitting the HARQ feedback may be semi-statically configured via RRC signaling. In particular, in the case of time resource, the timing gap between the PDSCH reception slot and its corresponding HARQ feedback information transmission slot may be transmitted to the UE via downlink allocation DCI or RRC signaling.

Even in the case of the PUCCH resource for CQI/CSI reporting, it may be likewise allocated via RRC signaling and downlink allocation DCI.

In FIG. 12, the shading blocks depict that the LBT (DL LBT) for downlink transmission in the base station succeeds so that downlink transmission in the subsequent time is performed via an unlicensed band. As an example, downlink transmission may be transmission of a downlink channel or signal indicating uplink transmission. For example, the downlink transmission may be PDSCH and its resultant PUCCH for HARQ feedback, the DCI requiring CQI/CSI reporting, and PUCCH for its resultant reporting, or DCI transmitting scheduling information for PUSCH and its resultant PUSCH. In this case, a timing gap occurs between the downlink transmission and the uplink transmission.

For example, where the downlink signal or channel according to downlink transmission indicates PUCCH transmission in the NR-U cell which is the unlicensed band, the UE is basically required to first perform the LBT (UL LBT) for the PUCCH transmission according to the regulation of the unlicensed spectrum, and whether to transmit the PUCCH is determined at the time indicated according to the result of the LBT. If the corresponding radio channel is occupied by another node as a result of the LBT, i.e., when an LBT failure occurs, the UE may fail to transmit the PUCCH at the indicated time.

However, where the downlink allocation DCI transmission slot including PUCCH resource allocation information and PUCCH transmission indication information or PDSCH transmission slot according to the corresponding downlink allocation DCI, and its resultant PUCCH transmission slot belong to the channel occupancy time (COT) of the base station, the corresponding UE may transmit the PUCCH without performing an LBT. This is why the base station already occupies for downlink transmission for the corresponding UE in the corresponding unlicensed band. Thus, it is not in the state of being occupied by another node. In other words, it may be possible to perform HARQ feedback transmission via the PUCCH without an LBT in the corresponding UE depending on K1, which is the timing gap between the base station's COT and PDSCH reception slot and its corresponding HARQ feedback information transmission slot.

Likewise, where CSI/CQI reporting via the PUCCH is indicated via the downlink allocation DCI, if the timing gap between the slot of transmitting the corresponding downlink allocation DCI and its resultant slot of performing PUCCH transmission including CQI/CSI reporting information is M, it may be possible to report CSI/CQI via the PUCCH without an LBT in the corresponding UE depending on the COT of the base station and the corresponding timing gap, M.

Further, like in the case where of the PUCCH, even for PUSCH transmission by the UE, K2, which is the timing gap information between the uplink grant DCI transmitted by the base station and the slot in which its resultant PUSCH transmission is performed may also be set semi-statically via RRC signaling by the base station or dynamically via uplink grant DCI. Even in such a case, if the uplink grant DCI transmission slot including the corresponding PUSCH transmission resource allocation information and its resultant PUSCH transmission slot fall within the channel occupancy time (COT) of the base station, the UE may perform PUSCH transmission without performing an LBT.

In relation thereto, according to an embodiment of the disclosure, the base station may configure an LBT scheme of performing an LBT upon PUCCH or PUSCH transmission in a UE and indicate the same to the UE. As an example, the LBT scheme may be divided into a plurality of schemes by at least one of whether to perform an LBT, whether to perform a random backoff, and the random backoff time. In the disclosure, the scheme of performing an LBT is denoted an 'LBT scheme,' but is not limited thereto. The scheme of performing an LBT may be denoted, e.g., an LBT category, or in other various manners.

As an example, the LBT scheme may include, e.g., i) a first LBT scheme in which no LBT is performed, ii) a second LBT scheme in which an LBT is performed but no random backoff is performed, iii) a third LBT scheme in which an LBT and a random backoff are performed but the random backoff time interval is fixed, and iv) a fourth LBT scheme in which an LBT and a random backoff are performed but the random backoff time interval is varied.

As an example, the base station directly may indicate whether to perform an LBT for uplink transmission of the UE via L1 control signaling. Specifically, it may be defined to include corresponding LBT indication information in the downlink allocation DCI format for transmitting PDSCH scheduling control information.

For example, the corresponding LBT indication information may be one-bit indication information. In this case, it may be defined that upon PUCCH transmission by the UE, corresponding to the corresponding downlink allocation DCI format according to the corresponding bit value (0, 1), it is determined whether to perform an LBT in the corresponding UE. In other words, in this case, the value of the corresponding bit may mean differentiating the first LBT scheme from the other LBT schemes among the above-described LBT schemes.

As another embodiment, the corresponding LBT indication information may be two-bit indication information. In this case, the LBT indication information may be defined to determine the LBT scheme for performing an LBT in the corresponding UE upon PUCCH transmission by the UE, corresponding to the corresponding downlink allocation DCI format according to the corresponding bit value (00, 01, 10, 11). In other words, in this case, the value of the corresponding bit may mean differentiating the first LBT scheme to the fourth LBT scheme among the above-described LBT schemes.

In this case, the UE's PUCCH transmission corresponding to the above-described downlink allocation DCI format may be PUCCH transmission for the UE's HARQ feedback information transmission according to the reception of the UE's PDSCH based on the corresponding downlink allocation DCI format. Or, another case of the UE's PUCCH transmission corresponding to the downlink allocation DCI format may be PUCCH transmission for CQI/CSI reporting when CQI/CSI reporting is triggered by the corresponding downlink allocation DCI format.

Likewise, it may be defined to include corresponding LBT indication information in the uplink grant DCI format for transmitting PUSCH scheduling control information.

For example, the corresponding LBT indication information may be one-bit indication information. In this case, the LBT indication information may be defined to indicate whether to perform an LBT in the corresponding UE, upon PUSCH transmission by the UE, corresponding to the corresponding uplink grant DCI format according to the corresponding bit value (0, 1). In other words, in this case, the value of the corresponding bit may mean differentiating the first scheme from the other schemes among the above-described LBT schemes.

As another embodiment, the corresponding LBT indication information may be two-bit indication information. In this case, the LBT indication information may be defined to determine the LBT scheme for performing an LBT in the corresponding UE, upon PUSCH transmission by the UE, corresponding to the corresponding uplink grant DCI format according to the corresponding bit value (00, 01, 10, 11). In other words, in this case, the value of the corresponding bit may mean differentiating the first scheme to the fourth scheme among the above-described LBT schemes.

However, the UE's PUSCH transmission corresponding to the uplink grant DCI format may be PUSCH transmission for the UE's UCI transmission or PUSCH transmission for the UE's uplink data transmission.

As another embodiment for defining an LBT scheme or whether to perform an LBT for uplink transmission in the UE, whether to perform an LBT may be defined to be determined by the timing gap between i) the downlink transmission where the corresponding uplink transmission is indicated and ii) its resultant uplink transmission as shown in FIG. 12.

As an example, where the timing gap is smaller than an arbitrary threshold, it may be defined to enable the indicated PUCCH or PUSCH transmission without an LBT in the corresponding UE. Or, it may be defined that, when the timing gap is larger than the corresponding threshold, the UE performs an LBT. Then, PUCCH or PUSCH transmission is enabled accordingly.

As an example, the corresponding threshold may be determined based on the COT value in the corresponding NR-U, or accordingly set via cell-specific RRC signaling or UE-specific RRC signaling by the base station or, regardless of the COT, set by the base station via cell-specific RRC signaling or UE-specific RRC signaling.

Additionally, the corresponding threshold may be defined as a single threshold or as different thresholds per uplink transmission case and may thus be set by the base station via cell-specific RRC signaling or UE-specific RRC signaling.

According to the embodiments shown above, an LBT scheme to be performed to transmit an uplink signal in an unlicensed band may be determined, and an uplink signal may be transmitted in the unlicensed band according to the determined LBT scheme.

The disclosure proposes a method of allocating a plurality of transmission opportunities on the frequency axis upon transmission a uplink radio channel or radio signal to increase the transmission probability for uplink in an unlicensed band in NR.

As described above, for any node to transmit a radio signal in an unlicensed band, an LBT (Listen Before Talk) process is first performed to identify whether the corresponding radio channel is occupied by another node. Accordingly, for PDSCH transmission for a UE in the NR-U cell in the unlicensed band configured by a NR base station, the base station needs to perform an LBT for the frequency band where the corresponding NR-U cell is configured. Where the radio channel in the corresponding unlicensed band is empty as a result of performing the LBT, the base station may transmit the PDCCH and resultantly PDSCH to the UE.

Likewise, for the UE to perform uplink signal transmission, the UE needs to first perform an LBT on the uplink radio channel. Thus, the UE needs to first perform an LBT upon transmitting the PUSCH for uplink data transmission. The UE may not transmit the scheduling control information received from the base station, i.e., unable to transmit the corresponding PUSCH at the time indicated by the UL grant DCI format, depending on whether the corresponding LBT succeeds. In other words, upon an LBT failure, PUSCH transmission by the corresponding UL grant may fail.

As described above, in NR, a bandwidth part (BWP) may be configured for each UE for transmission/reception of uplink or downlink radio physical channels and physical signals for the UE, and one BWP is activated and used. Further, since a wideband of 100 MHz or more is possible as the system bandwidth constituting the NR cell according to the frequency range (FR) where the corresponding NR cell is configured, unlike in LTE, the bandwidth of one BWP for a UE may thus be configured as a wideband of 100 MHz or more. In contrast, in the case where the DL or UL BWP for a UE in the NR-U cell configured via an unlicensed spectrum is larger than 20 MHz, when an LBT may be performed in the corresponding BWP unit and uplink or downlink transmission/reception is thus performed, the competitivity in light of channel access probability may be severely degraded as compared with other RATs, e.g., Wi-Fi, which perform an LBT in 20 MHz units.

Figure 13:
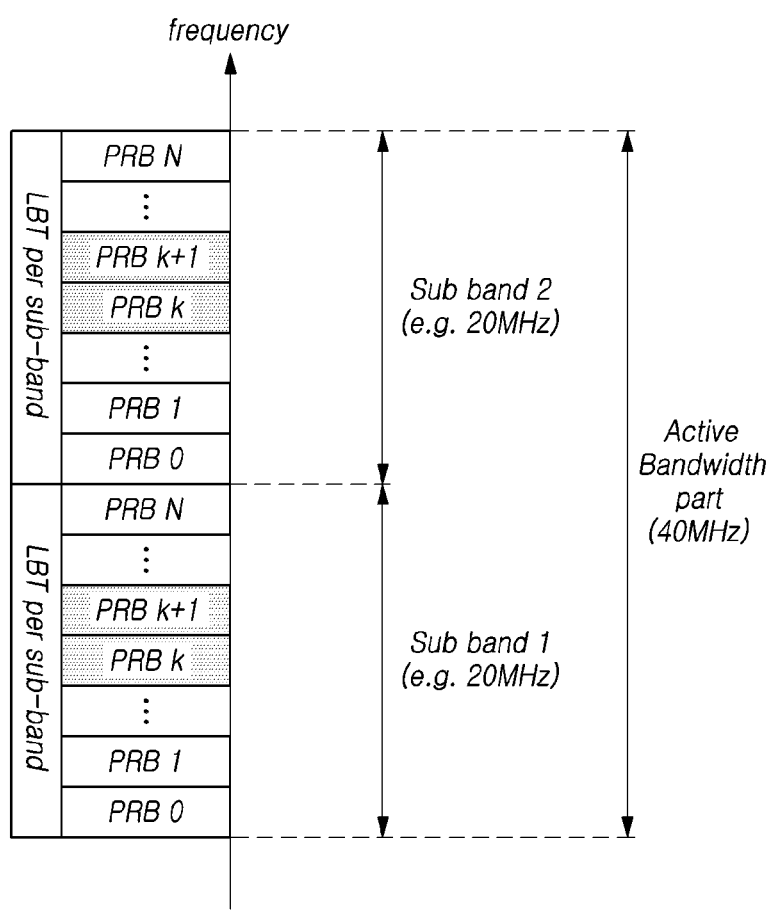
FIG. 13 is a view illustrating a configuration of a subband for a bandwidth part configured in a UE according to an embodiment.

To address this issue, such a method may be considered where a DL or UL BWP configured for a UE may be partitioned into subbands with a bandwidth, and an LBT is performed in the corresponding subband unit, and an uplink/downlink control channel and data channel is transmitted/received. In other words, the BWP configured in the UE may be constituted of N subbands. For example, FIG. 13 illustrates an example of an active 40 MHz BWP configured in the UE including two subbands.

For example, it may be defined that where the bandwidth of the DL BWP configured for a UE on downlink is 80 MHz, the corresponding DL BWP may be divided into four subbands each having a bandwidth of 20 MHz, and resource allocation and its resultant PDCCH or PDSCH transmission/reception is possible in the corresponding subband unit. A similar definition may be made for uplink as well. For example, it may be defined that where the bandwidth of a UL BWP is 60 MHz, the corresponding UL BWP may be divided into three subbands each having a bandwidth of 20 MHz, and resource allocation and its resultant PUCCH or PUSCH transmission/reception is possible in the corresponding subband unit.

As described above, it may be impossible to transmit the UE's allocated PUSCH at the time indicated by the UL grant DCI format, due to an LBT failure in the UE. To address this issue, in the case of LTE LAA, cell-specific PUSCH triggering DCI may be transmitted separately from the UE-specific UL grant for resource allocation, so that the time of the PUSCH transmission by the UE may be dynamically adjusted by the base station. In other words, the base station may allocate the PUSCH transmission resource for each UE via the UL grant and may additionally transmit PUSCH triggering DCI so that the UE performs PUSCH transmission according to the corresponding PUSCH transmission resource allocation information.

However, since, in LTE PUSCH triggering, the bandwidth of the LAA cell is configured not to exceed the bandwidth, e.g., 20 MHz, which is the unit of LBT, and resource allocation has been performed based on the same resource grid, based on the system bandwidth of the corresponding cell for all the UEs, ambiguity due to the corresponding cell-specific PUSCH triggering does not exist.

In contrast, as described above in the case of NR, a different UL BWP may be configured for each UE, and one BWP may be configured of one or more subbands which are the units of LBT. Thus, in the case where PUSCH transmission by cell-specific PUSCH triggering applies, in the case of a UE in which different UL BWPs have been configured or a UE to which a PUSCH resource has been allocated via one or more subbands, there may be ambiguity as to whether PUSCH triggering for the UL BWP of the corresponding UE has been performed and whether the PUSCH triggering for all the subbands where the PUSCH resource has been allocated is valid.

In the disclosure, there is proposed a PUSCH triggering method considering the subband-based LBT and the UL BWP configured per UE in the NR-U cell.

In the NR-U cell, PUSCH transmission may be performed via one UL grant DCI format according to the scheduling method of NR configured in a licensed spectrum and LTE. Or, PUSCH transmission may be performed in the form of 2-stage DCI as in the above-described LTE LAA PUSCH triggering method. Where PUSCH transmission is performed via 2-stage DCI, frequency domain resource allocation for PUSCH, modulation coding scheme (MCS), and HARQ count, or such allocation may be performed via the first UL grant DCI, and PUSCH transmission according to the allocation of the first DCI may be indicated via the second DCI.

In the disclosure, there is proposed a specific method of 2-stage DCI-based PUSCH transmission for NR.

In particular, in embodiments 1 to 3 described below, the 1-stage DCI may be UE-specifically transmitted, and the 2-stage DCI may be transmitted cell-specifically or in the form of UE-group common DCI. In contrast, in embodiment 4, both the 1-stage DCI and 2-stage DCI may be UE-specifically transmitted.

The embodiments described below may apply individually or in any combination.

Embodiment 1. Subband-Based Resource Allocation and PUSCH Triggering

As a PUSCH resource allocation method for a UE, resource allocation is performed for each of the subbands constituting the active UL BWP via the 1-stage UL grant DCI format, and PUSCH transmission triggering is performed per subband via the 2-stage PUSCH triggering DCI.

The subband-based resource allocation via the 1-stage DCI may commonly apply to all the subbands configured for the corresponding UE, and the resource allocation information transmitted via the 1-stage DCI through the 2-stage PUSCH triggering DCI is applied to indicate the subband where PUSCH transmission is performed.

Or, the subband-based resource allocation via the 1-stage DCI may be defined to include specific subband allocation information. Accordingly, the PUSCH transmission in the corresponding UE is performed only in the case where the PUSCH triggering for the subband allocated via the 1-stage DCI is indicated via the 2-stage DCI.

As such, where PUSCH triggering by the 2-stage DCI is performed in subband units, the corresponding 2-stage DCI includes subband indication information as a method for indicating the subband in which PUSCH triggering is performed via the 2-stage DCI. The indication information may be per-subband bitmap indication information or subband ID or subband index indication information.

Or, the per-subband indication information may be indicated by the CRC scrambling RNTI for the 2-stage DCI transmission. In other words, the CRC scrambling RNTI for identification for the 2-stage DCI may be allocated separately for each subband, and the corresponding value may be explicitly transmitted by the base station via higher layer signaling or the scrambling RNTI value may be defined in the form of a function using the UL BWP index and subband ID (or subband index) as a parameter.

Or, a CORESET or search space (SS) for transmitting the 2-stage DCI for each subband may be separately configured to determine the subband in which the PUSCH triggering is performed according to the CORESET or SS where the 2-stage DCI is transmitted. As an example, the CORESET or SS may be defined to be configured via the frequency resource of the same subband.

However, where resource allocation via the 1-stage DCI includes specific subband allocation information, the same method as those in the embodiment for indicating the subband of the 2-stage DCI described above may be applied to indicate the subband allocation information via the 1-stage DCI.

Embodiment 2. BWP-Based Resource Allocation and Subband-Based PUSCH Triggering

Unlike in embodiment 1, it may be defined that PUSCH transmission resource allocation via the 1-stage UL grant DCI format is performed based on the active UL BWP of the NR UE and that PUSCH triggering via the 2-stage DCI is performed for each of the subbands constituting the UL BWP.

In this case, it may be defined that PUSCH resource allocation via the 1-stage UL grant DCI format, similarly to typical DCI format 0_0 or 0_1, includes frequency domain resource allocation information based on the PRB constituting the active UL BWP or additionally includes one or more pieces of subband allocation information for NR-U.

In contrast, the 2-stage PUSCH triggering DCI may be defined so that PUSCH triggering is performed in subband units constituting the UL BWP as embodiment 1 described above. In this case, what has been described above in connection with embodiment 1 may be applied to the PUSCH triggering subband indication information via the 2-stage DCI, in substantially the same manner.

As such, where PUSCH resource allocation via the 1-stage DCI is performed based on the UL BWP, the PUSCH transmission operation on the UE may be varied depending on the subband where the PUSCH triggering according to the 2-stage DCI is performed. Specifically, the relationship between the PUSCH resource allocated via the 1-stage DCI and the subband in which triggering is performed via the 2-stage DCI may be divided into a fully overlapping case on the frequency axis, a partially overlapping case, and a non-overlapping case.

As described, the UE's PUSCH transmission operation by the PUSCH triggering of the 2-stage DCI for each case may be varied. For example, it may be defined that the UE performs PUSCH transmission only in the fully overlapping case. Or, it may be defined that PUSCH transmission is performed in the fully overlapping case and the partially overlapping case. However, it may be defined that in the partially overlapping case, PUSCH transmission is performed only via the overlapping frequency resource. In this case, the PUSCH transmission part for the non-overlapping resource may be punctured or rate-matched so that PUSCH transmission is performed in the corresponding overlapping frequency resource.

Embodiment 3. BWP-Based Resource Allocation and BWP-Based PUSCH Triggering 1-stage UL grant DCI and 2-stage PUSCH triggering DCI both may be performed in UL BWP units for the UE. In such a case, the resource allocation method via the 1-stage DCI may follow embodiment 2 described above.

In contrast, in a method for the base station to transmit the 2-stage PUSCH triggering DCI, the base station may perform the 2-stage PUSCH triggering only when the UE's PUSCH transmission is possible for all the subbands including the frequency resources allocated for a UE's PUSCH transmission via the 1-stage DCI.

Thus, the 2-stage PUSCH triggering DCI includes no separate subband indication information. Thus, the UE, upon receiving the 2-stage PUSCH triggering DCI, performs PUSCH transmission according to the PUSCH transmission resource allocation information transmitted via the 1-stage DCI.

Embodiment 4. UE-Specific PUSCH Triggering

According to the instant embodiment, 2-stage DCI, as well as 1-stage DCI, may be UE-specifically transmitted. In other words, PUSCH triggering by the 2-stage DCI may be UE-specifically performed. In this case, the method of transmitting each DCI and the information area included in the 1-stage DCI and the 2-stage DCI and its resultant UE PUSCH transmission method may follow all possible combinations of embodiments 1 to 3 described above, and no detailed description thereof is given below.

Further, although the description has been made focusing on the NR-U cell's PUSCH resource allocation in the disclosure, the above-described technical spirit may apply to the case of PDSCH in substantially the same manner. Further, the above-described technical spirit may apply to PUSCH/PDSCH scheduling via a normal NR cell configured via a licensed spectrum, not an NR-U cell, in substantially the same manner.

According to this, there may be provided a method and device capable of transmitting and receiving uplink data and downlink data based on the LBT result for one or more subbands for the bandwidth part in the unlicensed band.

A method for transmitting and receiving downlink data in an unlicensed band is described below with reference to relevant drawings. In this case, the above-described uplink data transmission/reception method may apply to the downlink data transmission/reception method in substantially the same manner, unless contradictory in technical spirit.

Figure 14:
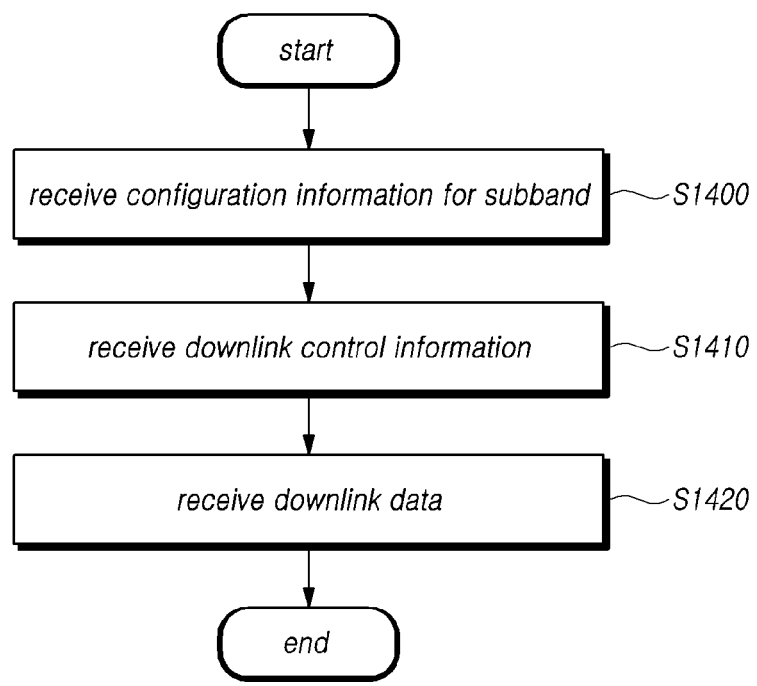
FIG. 14 is a flowchart illustrating a procedure for receiving downlink data in an unlicensed band by a UE according to an embodiment.

FIG. 14 is a flowchart illustrating a procedure for receiving downlink data in an unlicensed band by a UE according to an embodiment.

Referring to FIG. 14, the UE may receive, from the base station, configuration information for one or more subbands for the system bandwidth of the cell configured in an unlicensed band or a bandwidth part configured in the unlicensed band (S1400).

As described above, where bandwidth parts are configured in an unlicensed band, the bandwidth of the DL BWP or UL BWP for a UE in the NR-U cell may be configured to be larger than 20 MHz. In this case, if an LBT is performed in bandwidth part units and data transmission/reception is performed, the competitivity in light of channel access probability may be significantly degraded as compared with other radio access technology (RAT), e.g., Wi-Fi, which performs an LBT in 20 MHz units.

Therefore, as an example, to reduce the frequency range of the LBT which needs to be performed by the UE, the base station may divide the bandwidth part configured in the UE into a plurality of subbands. To that end, subband configuration information may be set per bandwidth part. That is, where four bandwidth parts are configured in the UE, the number of subbands, position, and size may be identical or different per bandwidth part. Or, the subband may be configured based on the system bandwidth constituting the NR cell of the corresponding unlicensed band independently from the bandwidth part configured for a UE.

For example, the subband configuration information may include at least one of the number of subbands in each bandwidth part or the system bandwidth, the bandwidth of the subband, the size of the subband, the number of PRBs of the subband, and bandwidth part identification information mapped to each subband.

As an example, the UE may receive the subband configuration information from the base station via higher layer signaling. As another example, the subband, which is the unit of LBT on the frequency axis, may be configured implicitly in the unit of the bandwidth part configured for a UE or the system bandwidth of the NR-U cell, i.e., according to a predetermined rule without signaling including separate subband configuration information.

Referring back to FIG. 14, the UE may receive downlink control information including the indication information for the subband determined for downlink transmission based on the result of the LBT operation performed by the base station among one or more subbands (S1410) and may receive downlink data in the determined subband (S1420).

As an example, the base station performs an LBT operation for the radio resource allocated to the UE in the unlicensed band to transmit downlink data to the UE. The base station may perform an LBT operation for each of at least one subband among one or more subbands for the bandwidth part configured in the UE. For example, the LBT operation may include sensing the energy level of the corresponding radio resource and comparing the sensed energy level with a predetermined reference energy level.

As an example, the base station may determine the subband for transmitting downlink data according to the result of performing the LBT operation on each of at least one subband. The base station may determine that the subband for which the LBT operation has been identified to succeed, among the subbands in which the LBT operation has been performed, is the subband for downlink data transmission.

The UE receives subband indication information for receiving downlink signals in the active bandwidth part. Specifically, as in embodiment 2 described above, separate downlink control information for indicating the LBT result on a per-subband basis may be configured by the base station separately from the DL allocation DCI format including downlink data transmission resource allocation control information and is transmitted cell-specifically or via UE-group common PDCCH. In other words, the base station transmits a cell-specific or UE-group common DCI format for indicating whether LBT succeeds/fails on a per-subband basis and this to the UE cell-specifically or via the UE-group common PDCCH. However, a new DCI format for the cell-specific or UE-group common DCI format to indicate whether LBT succeeds/fails on a per-subband basis may be defined or the existing DCI format may be reused.

The UE may receive downlink data via the subband indicated as available for transmission of downlink data, based on the received downlink control information.

According to the embodiments described above, there may be provided a method and device capable of transmitting and receiving downlink data based on the LBT result for one or more subbands for the bandwidth part in the unlicensed band. By so doing, the UE may prevent a reduction in data transmission probability that may arise as the LBT is performed in a wide frequency area and meet the data transmission QoS using the unlicensed band.

Figure 15:
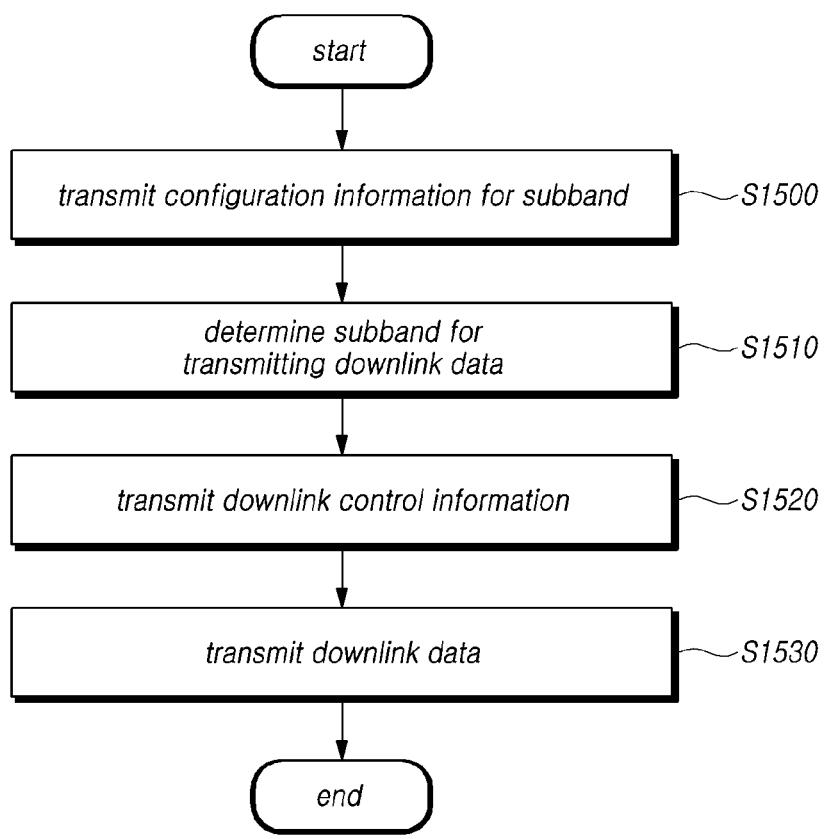
FIG. 15 is a flowchart illustrating a procedure for transmitting downlink data in an unlicensed band by a base station according to an embodiment.

FIG. 15 is a flowchart illustrating a procedure for transmitting downlink data in an unlicensed band by a base station according to an embodiment.

Referring to FIG. 15, the base station may transmit, to the UE, configuration information for one or more subbands for the system bandwidth of the cell configured in an unlicensed band or a bandwidth part configured in the unlicensed band (S1500).

As described above, where bandwidth parts are configured in an unlicensed band, the bandwidth of the DL BWP or UL BWP for a UE in the NR-U cell may be configured to be larger than 20 MHz. In this case, if an LBT is performed in bandwidth part units and data transmission/reception is performed, the competitivity in light of channel access probability may be significantly degraded as compared with other radio access technology (RAT), e.g., Wi-Fi, which performs an LBT in 20 MHz units.

Therefore, as an example, to reduce the frequency range of the LBT which needs to be performed by the UE, the base station may divide the bandwidth part configured in the UE into a plurality of subbands. To that end, subband configuration information may be set per bandwidth part. That is, where four bandwidth parts are configured in the UE, the number of subbands, position, and size may be identical or different per bandwidth part. Or, the subband may be configured based on the system bandwidth constituting the NR cell of the corresponding unlicensed band independently from the bandwidth part configured for a UE.

For example, the subband configuration information may include at least one of the number of subbands in each bandwidth part or the system bandwidth, the bandwidth of the subband, the size of the subband, the number of PRBs of the subband, and bandwidth part identification information mapped to each subband.

As an example, the base station may transmit the subband configuration information to the UE via higher layer signaling. As another example, the subband, which is the unit of LBT on the frequency axis, may be configured implicitly in the unit of the bandwidth part configured for a UE or the system bandwidth of the NR-U cell, i.e., according to a predetermined rule without signaling including separate subband configuration information.

Referring back to FIG. 15, the base station may perform an LBT operation on each of one or more subbands and determine the subband for transmitting downlink data based on the result of the LBT operation (S1510).

As an example, the base station performs an LBT operation for the radio resource allocated to the UE in the unlicensed band to transmit downlink data to the UE. The base station may perform an LBT operation for each of at least one subband among one or more subbands for the bandwidth part configured in the UE. For example, the LBT operation may include sensing the energy level of the corresponding radio resource and comparing the sensed energy level with a predetermined reference energy level.

For example, the base station may determine the subband for transmitting uplink data according to the result of performing the LBT operation on each of at least one subband. The base station may determine that the subband for which the LBT operation has been identified to succeed, among the subbands in which the LBT operation has been performed, is the subband for downlink data transmission.

Referring back to FIG. 15, the base station may transmit downlink control information including the indication information for the determined subband (S1520) and transmit downlink data in the determined subband (S1530).

The base station transmits downlink scheduling information to the UE to transmit downlink data in the active bandwidth part for the UE. Here, since the bandwidth part may be configured of one or more subbands as described above, downlink scheduling information for one or more subbands may be received via one piece of downlink control information.

The downlink control information may include at least one of frequency domain resource allocation information, such as the bandwidth part indication information and subband indication information used for downlink data transmission, and time domain resource allocation information for downlink data transmission. In this case, as an example, the subband indication information indicating the subband available for reception of downlink data, where the LBT operation is identified to succeed, may be transmitted via the cell-specific PDCCH or group-common PDCCH.

The base station may transmit downlink data via the subband indicated as available for transmission of downlink data, based on the transmitted downlink control information.

According to the embodiments described above, there may be provided a method and device capable of transmitting and receiving uplink data based on the LBT result for one or more subbands for the bandwidth part in the unlicensed band. By so doing, the UE may prevent a reduction in data transmission probability that may arise as the LBT is performed in a wide frequency area and meet the data transmission QoS using the unlicensed band.

Structural configurations of a UE and a base station which may perform all or some of the embodiments described above in connection with FIGS. 1 to 15 are described below with reference to the drawings.

Figure 16:
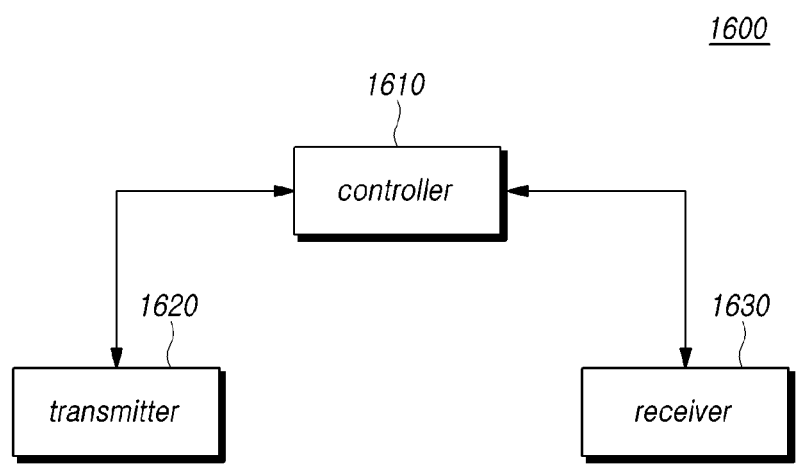
FIG. 16 is a view illustrating a UE according to an embodiment.

FIG. 16 is a diagram illustrating a UE 1600 according to an embodiment.

Referring to FIG. 16, a UE 1600 includes a controller 1610, a transmitter 1620, and a receiver 1630.

The controller 1610 controls the overall operation of the UE 1600 according to the method of transmitting/receiving uplink data and downlink data in an unlicensed band needed to perform the above-described disclosure. The transmitter 1620 transmits uplink control information and data or messages to the base station via a corresponding channel. The receiver 1630 receives downlink control information and data or messages from the base station via a corresponding channel.

The receiver 1630 may receive configuration information for one or more subbands for the system bandwidth of the cell configured in an unlicensed band or a bandwidth part configured in the unlicensed band. As an example, to reduce the frequency range of the LBT which needs to be performed by the UE, the base station may divide the bandwidth part configured in the UE into one or more subbands.

To that end, subband configuration information may be set per bandwidth part. The number of subbands, position, and size may be identical or different per bandwidth part. For example, the subband configuration information may include at least one of the number of subbands in each bandwidth part or the system bandwidth, the bandwidth of the subband, the size of the subband, the number of PRBs of the subband, and bandwidth part identification information mapped to each subband.

As an example, the receiver 1630 may receive the subband configuration information via higher layer signaling. The higher layer signaling including the subband configuration information may include LBT configuration information for each subband for performing an LBT operation in each subband. For example, the higher layer signaling may include LBT configuration information including information (e.g., a threshold) needed for the UE to perform the LBT in each subband. The LBT configuration information may include different parameters for each subband or the same parameters may be configured regardless of the subbands. As another example, the subband, which is the unit of LBT on the frequency axis, may be configured implicitly in the unit of the bandwidth part configured for a UE or the system bandwidth of the NR-U cell, i.e., according to a predetermined rule without signaling including separate subband configuration information.

The receiver 1630 may receive downlink control information including the uplink scheduling information for one or more subbands. The receiver 1630 may receive uplink scheduling information from the base station to transmit uplink data in the active bandwidth part. Here, since the bandwidth part may be configured of one or more subbands as described above, uplink scheduling information for one or more subbands may be received via one piece of downlink control information.

The downlink control information may include at least one of subband indication information indicating one or more subbands, which are the target for the LBT operation, bandwidth part indication information indicating the bandwidth part including one or more subbands, which are the target for the LBT operation, function domain resource allocation information for uplink data transmission, and time domain resource allocation information for uplink data transmission. In this case, as an example, the subband indication information may be per-subband bitmap indication information or subband ID or subband index indication information.

The controller 1610 may perform an LBT operation on each of at least one subband based on uplink scheduling information. The controller 1610 may determine the subband for transmitting uplink data based on the result of the LBT operation. The transmitter 1620 may transmit uplink data in the determined subband.

As an example, the controller 1610 performs an LBT operation for the radio resource allocated to the UE by uplink scheduling information. The controller 1610 may perform an LBT operation on each of at least one subband indicated by the uplink scheduling information among the one or more subbands constituting the bandwidth part. For example, the LBT operation may include sensing the energy level of the corresponding radio resource and comparing the sensed energy level with a predetermined reference energy level.

Or, the controller 1610 may determine the subband for transmitting uplink data based on the subband selection rule and per-subband energy level values measured as the result of the LBT operation. As an example, the subband selection rule may be indicated by the base station or may be pre-configured in the UE. For example, the subband selection rule may be configured based on at least one of the subband index information, information indicating whether the reference signal is received for each subband, base station indication information, and information indicating whether a default subband exists.

As an example, the controller 1610 may determine the subband for transmitting uplink data according to the result of performing the LBT operation on each of at least one subband indicated by the uplink scheduling information.

As an example, upon identifying that the LBT operation is successful for all of the subbands in which the LBT operation has been performed, the controller 1610 may determine that all of the subbands are subbands for uplink data transmission. In this case, the controller 1610 may control the transmitter 1620 to transmit uplink data only when the LBT operation is identified to succeed on all of the subbands in which the LBT operation has been performed.

Or, where uplink data transmission is possible in two or more subbands as a result of performing the LBT operation, the transmitter 1620 may transmit uplink data using one or more subband radio resources by the above-described subband selection rule. For example, the controller 1610 may select one or more subbands according to the subband selection rule, such as selecting the subband with the lowest or highest subband index among the one or more subbands selected as a result of the LBT operation, selecting the subband in which a reference signal is received, selecting the subband indicated by the base station, or selecting the subband set as default.

As an example, the receiver 1630 may receive downlink control information including the subband indication information determined based on the result of performing the LBT operation by the base station among one or more subbands. The receiver 1630 may receive downlink data in the determined subband.

As an example, the base station performs an LBT operation for the radio resource allocated to the UE in the unlicensed band to transmit downlink data to the UE. The base station may perform an LBT operation for each of at least one subband among one or more subbands for the bandwidth part configured in the UE.

As an example, the base station may determine the subband for transmitting uplink data according to the result of performing the LBT operation on each of at least one subband. The base station may determine that the subband for which the LBT operation has been identified to succeed, among the subbands in which the LBT operation has been performed, is the subband for downlink data transmission.

The receiver 1630 receives downlink scheduling information from the base station to receive downlink data in the active bandwidth part.

The downlink control information may include at least one of frequency domain resource allocation information, such as the bandwidth part indication information and subband indication information used for downlink data transmission, and time domain resource allocation information for downlink data transmission. In this case, as an example, the receiver 1630 may receive the subband indication information indicating the subband available for reception of downlink data via the cell-specific downlink control channel (PDCCH) or group-common downlink control channel (PDCCH).

The receiver 1630 may receive downlink data via the subband indicated as available for transmission of downlink data, based on the received downlink control information.

According to the embodiments above, there may be provided a method and device capable of transmitting and receiving uplink data based on the LBT result for one or more subbands for the system bandwidth or bandwidth part in the unlicensed band. By so doing, the UE may prevent a reduction in data transmission probability that may arise as the LBT is performed in a wide frequency area and meet the data transmission QoS using the unlicensed band.

Figure 17:
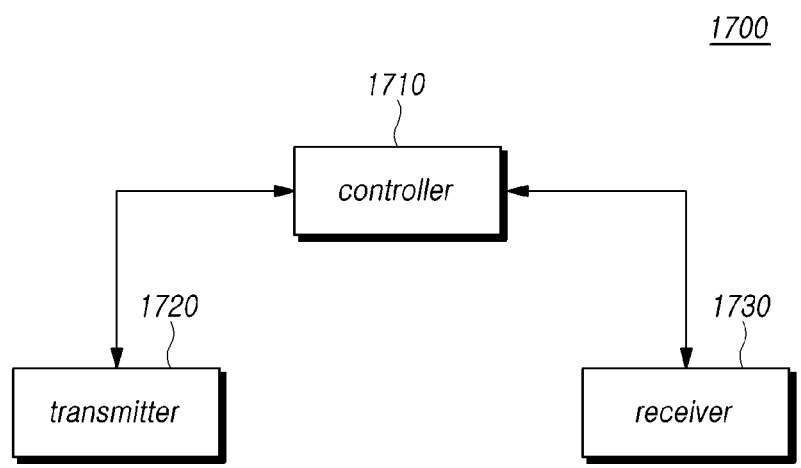
FIG. 17 is a view illustrating a base station according to an embodiment.

FIG. 17 is a block diagram illustrating a base station 1700 according to an embodiment.

Referring to FIG. 17, a base station 1700 includes a controller 1710, a transmitter 1720, and a receiver 1730.

The controller 1710 controls the overall operation of the base station 1700 according to the method of receiving uplink control information in an unlicensed band needed to perform the above-described disclosure. The transmitter 1720 and the receiver 1730 are used to transmit or receive signals or messages or data necessary for performing the above-described disclosure, with the UE.

The transmitter 1720 may transmit, to the UE, configuration information for one or more subbands for the system bandwidth of the cell configured in an unlicensed band or a bandwidth part configured in the unlicensed band. As an example, to reduce the frequency range of the LBT which needs to be performed by the UE, the controller 1710 may divide the bandwidth part configured in the UE or the system bandwidth of the cell configured in the unlicensed band into one or more subbands.

To that end, subband configuration information may be set per bandwidth part. The number of subbands, position, and size may be identical or different per bandwidth part.

For example, the subband configuration information may include at least one of the number of subbands in each bandwidth part, the bandwidth of the subband, the size of the subband, the number of PRBs of the subband, and bandwidth part identification information mapped to each subband.

As an example, the transmitter 1720 may transmit the subband configuration information via higher layer signaling. The higher layer signaling including the subband configuration information may include LBT configuration information for each subband for performing an LBT operation in each subband. For example, the higher layer signaling may include LBT configuration information including information (e.g., a threshold) needed for the UE to perform the LBT in each subband. The LBT configuration information may include different parameters for each subband or the same parameters may be configured regardless of the subbands.

The transmitter 1720 may transmit downlink control information including the uplink scheduling information for one or more subbands. The transmitter 1720 may transmit uplink scheduling information to the UE to receive uplink data in the active bandwidth part. Here, since the bandwidth part may be configured of one or more subbands as described above, uplink scheduling information for one or more subbands may be transmitted via one piece of downlink control information.

The downlink control information may include at least one of subband indication information indicating one or more subbands, which are the target for the LBT operation, bandwidth part indication information indicating the bandwidth part including one or more subbands, which are the target for the LBT operation, function domain resource allocation information for uplink data transmission, and time domain resource allocation information for uplink data transmission. In this case, as an example, the subband indication information may be per-subband bitmap-based indication information or subband ID or subband index indication information.

The receiver 1730 may receive uplink data in the subband determined based on the result of performing the LBT operation by the UE for each of at least one subband in the bandwidth part. By the above-described UE operations, the receiver 1730 may receive uplink data from the UE via the radio resource of the selected subband.

As an example, the UE performs an LBT operation for the radio resource allocated to the UE by uplink scheduling information. The UE may perform an LBT operation on each of at least one subband indicated by the uplink scheduling information among the one or more subbands constituting the bandwidth part or system bandwidth. For example, the LBT operation may include sensing the energy level of the corresponding radio resource and comparing the sensed energy level with a predetermined reference energy level.

Or, the UE may determine the subband for transmitting uplink data based on the subband selection rule and per-subband energy level values measured as the result of the LBT operation. As an example, the subband selection rule may be indicated by the base station or may be pre-configured in the UE. For example, the subband selection rule may be configured based on at least one of the subband index information, information indicating whether the reference signal is received for each subband, base station indication information, and information indicating whether a default subband exists.

As an example, the UE may determine the subband for transmitting uplink data according to the result of performing the LBT operation on each of at least one subband indicated by the uplink scheduling information.

As an example, upon identifying that the LBT operation is successful for all of the subbands in which the LBT operation has been performed, the UE may determine that all of the subbands are subbands for uplink data transmission. In this case, the UE may be configured to transmit uplink data only when the LBT operation is identified to succeed on all of the subbands in which the LBT operation has been performed. The receiver 1730 may receive uplink data via all of the subbands where the LBT operation performed by the UE has been identified to succeed.

As an example, the controller 1710 may perform an LBT operation on each of one or more subbands and determine the subband for transmitting downlink data based on the result of the LBT operation.

As an example, the controller 1710 performs an LBT operation for the radio resource allocated to the UE in the unlicensed band to transmit downlink data to the UE. The controller 1710 may perform an LBT operation for each of at least one subband among one or more subbands for the bandwidth part configured in the UE. For example, the LBT operation may include sensing the energy level of the corresponding radio resource and comparing the sensed energy level with a predetermined reference energy level.

As an example, the controller 1710 may determine the subband for transmitting uplink data according to the result of performing the LBT operation on each of at least one subband. The controller 1710 may determine that the subband for which the LBT operation has been identified to succeed, among the subbands in which the LBT operation has been performed, is the subband for downlink data transmission.

The transmitter 1720 may transmit downlink control information including the downlink scheduling information for the determined subband and transmit downlink data in the determined subband.

The transmitter 1720 transmits downlink scheduling information to the UE to transmit downlink data in the active bandwidth part for the UE. Here, since the bandwidth part may be configured of one or more subbands as described above, downlink scheduling information for one or more subbands may be received via one piece of downlink control information.

The downlink control information may include at least one of frequency domain resource allocation information, such as the bandwidth part indication information and subband indication information used for downlink data transmission, and time domain resource allocation information for downlink data transmission. In this case, as an example, the subband indication information indicating the subband available for reception of downlink data, where the LBT operation is identified to succeed, may be transmitted via the cell-specific PDCCH or group-common PDCCH.

The transmitter 1720 may transmit downlink data via the subband indicated as available for transmission of downlink data, based on the transmitted downlink control information.

According to the embodiments above, there may be provided a method and device capable of transmitting and receiving uplink data based on the LBT result for one or more subbands for the bandwidth part in the unlicensed band. By so doing, the UE may prevent a reduction in data transmission probability that may arise as the LBT is performed in a wide frequency area and meet the data transmission QoS using the unlicensed band.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for an uplink data transmission using an unlicensed band by a user equipment (UE), the method comprising:
    configuring multiple subbands of a bandwidth part for the unlicensed band;
    receiving downlink control information including frequency domain resource allocation information for transmitting uplink data;
    performing an listen before talk (LBT) operation on each of the multiple subbands based on the downlink control information;
    determining whether the LBT operation is succeed on all of the multiple subbands; and
    performing a transmission of the uplink data based on the determination that the LBT operation is succeed on all of the multiple subbands.

2. A user equipment (UE) for an uplink data transmission using an unlicensed band, the UE comprising:

a receiver configured to receive downlink control information including frequency domain resource allocation information for transmitting uplink data;

a controller configured to configure multiple subbands of a bandwidth part for the unlicensed band, perform an listen before talk (LBT) operation on each of the multiple subbands based on the downlink control information, and determine whether the LBT operation is succeed on all of the multiple subbands; and a transmitter configured to perform a transmission of the uplink data based on the determination that the LBT operation is succeed on all of the multiple subbands.

3. The method of claim 1, wherein the downlink control information is received via a physical downlink control channel (PDCCH).

4. The UE of claim 2, wherein the downlink control information is received via a physical downlink control channel (PDCCH).

5. The method of claim 1, further comprising:
receiving configuration information for configuring the multiple subbands.

6. The UE of claim 2, wherein the receiver further configured to receive configuration information for configuring the multiple subbands.

* * * * *